CIRCUIT ARRANGEMENT FOR THE FORMATION OF A SIGNAL FROM A PLURALITY OF OTHER SIGNALS

Filed Aug. 15, 1958

INVENTORS
JOHANNES KAASHOEK
TEUNIS POORTER
BY Frank R. Jifani
AGENT

Aug. 28, 1962 J. KAASHOEK ETAL 3,051,912

CIRCUIT ARRANGEMENT FOR THE FORMATION OF A SIGNAL FROM A PLURALITY OF OTHER SIGNALS

Filed Aug. 15, 1958 3 Sheets-Sheet 2

INVENTORS
JOHANNES KAASHOEK
TEUNIS POORTER
BY
AGENT

INVENTORS
JOHANNES KAASHOEK
TEUNIS POORTER
BY
Frank R. Jifani
AGENT

United States Patent Office 3,051,912
Patented Aug. 28, 1962

3,051,912

CIRCUIT ARRANGEMENT FOR THE FORMATION OF A SIGNAL FROM A PLURALITY OF OTHER SIGNALS

Johannes Kaashoek and Teunis Poorter, Eindhoven, Netherlands, assignors to North American Philips Company, Inc., New York, N.Y., a corporation of Delaware Filed Aug. 15, 1958, Ser. No. 755,327
Claims priority, application Netherlands Aug. 27, 1957
4 Claims. (Cl. 330—69)

The invention relates to a circuit arrangement for the formation of a signal from a plurality of other signals, the formed signal is linearly dependent upon the forming signals.

Such circuit arrangements are employed, inter alia in radio and television studio apparatus, in which a plurality of signals originating from microphones or television cameras are fed to a so-called matrix circuit, the output signal of which is linearly dependent upon the signals supplied thereto.

In certain cases, the coefficients determining the said linear relationship may be varied, so that, in the formed signal, certain signals are more pronounced than the others.

In colour television arrangements, in which a correction signal is to be formed with the aid of the so-called brightness signal, the problem arises that, in view of this correction, it is not sufficient for the various coefficients which determine the linear relationship in this brightness signal to be varied separately, there must, moreover, be a definite linear relationship between the coefficients themselves, since otherwise an erroneous correction is obtained, if neutral white or grey is to be reproduced. This would be particularly undesirable with a bright white signal with maximum amplitudes of the composing colour signals.

The circuit arrangement according to the invention provides a solution for this problem and is characterized in that the arrangement comprises impedances having displaceable tappings, in which arrangement the said signals being fed to the terminals of the impedances, the signal obtained from a tapping being supplied to the control-electrode of an amplifying element, whilst to at least one further amplifying element is supplied either a signal obtained from a different tapping or the sum of the forming signals, supplied with a given strength, the combined signal obtained from the outputs of the amplifying elements being a linear combination of the forming signals, in which combination the coefficients determining this linear relationship are variable by means of the said tappings and with the aid of means provided in the outputs of the amplifying elements in such a manner between 0 and 1 that, irrespective of the positions of the said tappings, their sum remains equal to 1.

A potential embodiment of the arrangement according to the invention will be described with reference to the figures.

FIG. 1 shows a first embodiment;

FIG. 2 serves for explanation;

Figure 1:
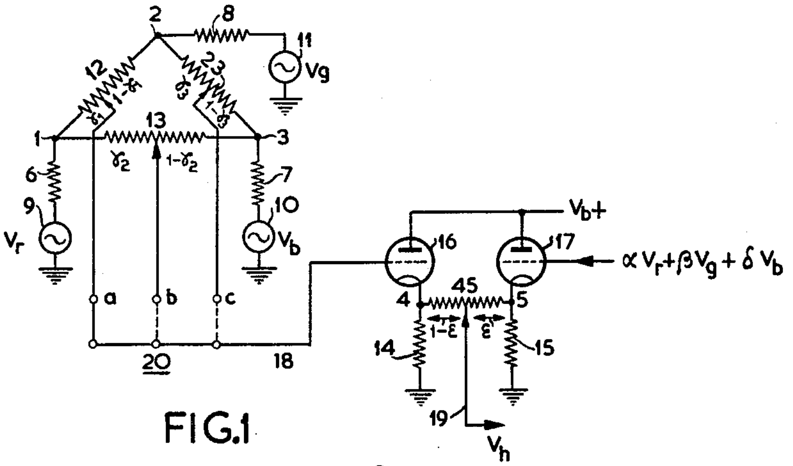
FIG. 1 shows a so-called variable matrix arrangement for use in a three-colour television system, in which, for example $V_r$ designates the red signals, $V_g$ the green signal and $V_b$ the blue signal.

It is known that with the reproduction of colour television signals, apart from the conventional gamma corrections, which relate to the non-linearities of the reproducing tubes, additional corrections can be carried out, whilst the total brightness signal $V_{ij}$, which is composed of three colour signals in accordance with the formula $$V_{ij}=\alpha V_r+\beta V_g+\delta V_b \qquad (1)$$

wherein $\alpha$, $\beta$, and $\delta$ represent proportionality constants varying with the system employed, is used to form a correction siganl, which is a function of this brightness signal. After multiplication of this formed signal by the colour signal to be corrected, and if the contrast region to be recorded is larger than that covered by the reproducing apparatus, a corrected signal may be obtained, of which the exponent power must be lower than 1. If, on the contrary, the contrast region to be recorded is smaller than that covered by the reproducing apparatus, the power exponent of the corrected signal must exceed 1.

If for the signal formed from the brightness signal $V_{ij}$ a signal of the form:

$$f(V_{ij})=\frac{1}{(V_{ij})^n}$$

is chosen, signals will be produced of the form $$V''_r=\frac{1}{(V_{ij})^n}\cdot V_r$$

$$V''_g=\frac{1}{(V_{ij})^n}\cdot V_g \qquad (2)$$

$$V''_b=\frac{1}{(V_{ij})^n}\cdot V_b$$

after multiplication by the signals $V_r$, $V_g$ and $V_b$.

It should be noted here that both the formation of $f(V_{ij})$ and the multiplication process may be carried out in three substantially identical multiplication arrangements.

A correct addition of the signals of (2) gives:

$$V'_{ij}=\alpha V''_r+\beta V''_g+\delta V''_b$$
$$=\frac{1}{(V_{ij})^n}(\alpha V_r+\beta V_g+\delta V_b)=(V_{ij})^{1-n}$$

Herein $(1-n)$ is the aforesaid power exponent. In the first-mentioned case $(1-n)$ must be smaller than 1, so that to $n$ must apply: $0<n<1$, wherein, in accordance with the additional brightness signal desired, $n$ can be chosen to be higher or lower within the said range.

In the second case it must obtain that: $1-n>1$, so that $n$ must be $<0$; also in this case the desired additional correction determines the choice of $n$.

It should be noted that the normal gamma correction may be carried out both prior to and after this additional correction. Only when strongly saturated colours prevail, deviations occur in the first-mentioned case, which, however, exert a negligibly low influence, as is evident from a calculation.

This brightness correction is not only important for the matching of the contrast regions, but also in those cases in which, for example a film is to be scanned and reproduced in a television reproducing apparatus. This film may have a $\gamma\neq 1$, which can be compensated by the aforesaid method.

Also in those cases in which the brightness of the dark image parts is to be pronounced against the bright parts, this method is advantageous.

However, this brightness correction has the following disadvantage. Assuming that the green and the blue signal are very small for a given detail of the total image to be reproduced, we may write for the brightness signal, with a certain approximation:

$$V_{ij}=\alpha V_r$$

Subsequent to correction a signal:

$$V'''_{ij}=\frac{1}{(\alpha V_r)^n}\cdot\alpha V_r=(\alpha V_r)^{1-n}$$

is obtained.

Now $n$ is only the determining factor, which means, since $n$ is fixed for the correction of the image concerned, that the red colour as such cannot be touched up in the image detail concerned, which may be desirable in certain cases. The same applies, of course, to an image detail having more or less saturated green and blue and also to combination signals, in which given colour components are to be touched up additionally.

There should therefore be means to vary separately the coefficients $\alpha$, $\beta$ and $\delta$, whilst yet with a neutral colour the correction signal remains equal to the correction signal, of which the coefficients have not been varied, so that the correction of this neutral signal does not depend upon the separate colour correction. If, in the aforesaid case, for example the $\alpha$ of the correction signal is rendered smaller, this means that the brightness of the red details in the image to be reproduced is pronounced. It may be said, as a rule, that the brightness of those colour details is emphasized, of which the coefficient(s) for the colour(s) concerned in the correction signal is (are) reduced. Conversely, as a matter of course, the brightness of those colour details is reduced, of which the coefficient(s) for the colour(s) concerned in the correction signal is (are) raised. With complex signals no colour distortion occurs, since, as it follows from Equation 2, the correction signal is multiplied by the three colour signals, so that the relative ratios are maintained. The arrangement shown in FIG. 1 provides the possibility of composing the desired correction signal.

To the potentiometer 12 between the points 1 and 2, are fed the signal $V_r$, supplied by the signal source 9 with its internal resistor 6, and the signal $V_g$, supplied by the signal source 11 with its internal resistor 8. If the resistance value of the resistors 6 and 8 is small with respect to that of potentiometer 12 and if the resistance value between the tapping and point 1 is a fraction $\gamma_1$ of the total resistance value, the voltage at point $a$ of the switch 20 will be:

$$V''_a=V_r(1-\gamma_1)+V_g\cdot\gamma_1 \qquad (3)$$

Also the blue signal supplied by the signal source 10 with its internal resistance 7 is fed to point 3. In a similar manner as stated above the voltage at point $b$ is given by $$V'_b=V_r\cdot(1-\gamma_2)+V_b\cdot\gamma_2 \qquad (4)$$

and that at point $c$ by:

$$V'_c=V_g\cdot(1-\gamma_3)+V_b\cdot\gamma_3 \qquad (5)$$

It should be noted that a satisfactory operation of the arrangement requires that with equal amplitudes of the signals $V_r$, $V_g$ and $V_b$, also the amplitudes of the signals at points 1, 2 and 3 should have the same value.

In accordance with the position of the switch 20, the main contact of which is connected to the conductor 18, one of the signals according to 3, 4 or 5 is fed via the conductor 18 to the control-grid of the discharge tube 16. Moreover, the total brightness signal $V_{ij}$ is fed to the control-grid of the tube 17.

If $R_{45}\gg R_{15}$ and $R_{45}\gg R_{14}$, and if the switch 20 connects the conductor 18 to point $a$, the voltage across the conductor 19 can be represented with some approximation by:

$$V_h=\epsilon\{V_r(1-\gamma_1)+V_g\cdot\gamma_1\}+(1-\epsilon)\{\alpha.V_r+\beta.V_g+\delta.V_b\} \qquad (6)$$

wherein it is assumed that the resistance value between the tapping of potentiometer 45 and point 5 is a fraction $\epsilon$ of the total resistance value. Also in this case a satisfactory operation of the arrangement requires that the amplitudes of the signals at points 4 and 5 should be equal to each other.

If point $b$ is connected to conductor 18, it is found that:

$$V_h=\epsilon\{V_r\cdot(1-\gamma_2)+V_b\cdot\gamma_2\}+(1-\epsilon)\{\alpha.V_r+\beta.V_g+\delta.V_b\} \qquad (7)$$

and for point $c$:

$$V_h=\epsilon\{V_g\cdot(1-\gamma_3)+V_b\cdot\gamma_3\}+(1-\epsilon)\{\alpha.V_r+\beta.V_g+\delta.V_b\} \qquad (8)$$

The new correction signal $V_h$ replaces, for the brightness correction the initial signal $V_{ij}$. The additionally corrected signal then becomes:

$$V'''_{ij}=\frac{1}{(V_h)^n}V_{ij} \qquad (9)$$

From 6, 7 and 8 it follows that with the aid of the coefficients $\epsilon$, $\gamma_1$, $\gamma_2$ and $\gamma_3$ each desired ratio between the colour components can be adjusted. Yet, in the case in which the amplitudes of the signals are equal to one another, i.e. with a neutral colour, the correction signal remains equal to the correction signal obtained without the possibility of varying the coefficients. If it is assumed that $V_r=V_g=V_b=V_w$, it follows from 6:

$$V_{hw}=\epsilon\{V_w\cdot(1-\gamma_1)+V_2\cdot\gamma_1\}+(1-\epsilon)\{\alpha.V_w+\beta.V_w+\delta.V_w\}$$

since, for each colour television system obtains that $\alpha+\beta+\delta=1$, it is found therefrom, irrespective of the value of $\epsilon$ and $\gamma_1$ $$V_{hw}=V_w$$

so that 9 changes into:

$$V'''_{ijw}=(V_w)^{1-n}$$

If use had been made of the correction signal $V_{ij}$, then $V_{ij}=V_w$, so that the same result is obtained.

For a bright white signal $V_{wmax}=1$, so that the exponent $(1-n)$ does no longer affect the signals, which are therefore not corrected.

The same applies to the Formulae 7 and 8, so that, irrespective of the positions of the tappings on the potentiometers 12, 13, 23 and of the switch 20, with a neutral colour the correction is not varied, or with maximum white no correction at all occurs. This is due to the fact that, irrespective of the positions of the tappings, the sum of the coefficients remains equal to 1.

Figure 2:
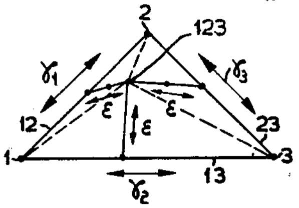

FIG. 2 illustrates by means of a colour triangle the region covered by this arrangement. Herein 123 designates the point which is the initial brightness signal $V_{ij}$. The lines from this point to the triangle sides 12, 13, 23, i.e. to the points determined by the positions of the tappings on the potentiometers 12, 13 and 23, can be covered by a variaion of $\epsilon$ and by a variation of the $\gamma$ values these lines can be displaced so as to coincide with the lines of the triangle connecting the corners with the point 123. The latter are indicated as broken lines in FIG. 2. By variation of $\gamma_1$ and $\epsilon$ between 0 and 1, the region associated with the triangle 1, 2, 123 can be covered and similarly by variation of $\gamma_2$ and $\epsilon$, the triangle 1, 3, 123 and finally by variation of $\gamma_3$ and $\epsilon$ the remaining part of the triangle 1, 2, 3.

As a rule, it can be stated that the desired hue correction can be adjusted by means of the $\gamma$ values and the saturation correction by means of the $\epsilon$ values, so that the direction and the degree of correction are completely controllable.

Figure 3:
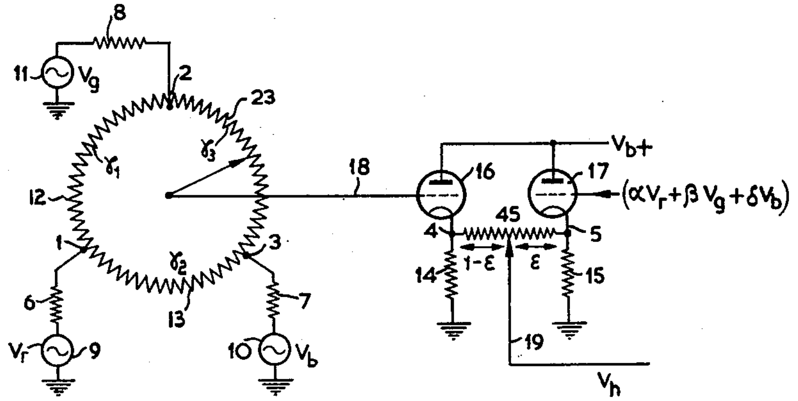
FIG. 3 shows a second embodiment.

FIG. 3 shows a second embodiment, in which corresponding elements are designated as in FIG. 1. The switch 20 is omitted, but replaced by a running contact 21, which is slidable along the three joined resistors 12, 13 and 23, so that it determines the adjustment of the coefficients $\gamma_1$, $\gamma_2$ and $\gamma_3$. This has the advantage that the arrangement can operate with one instead of three control-members. To the points 1, 2 and 3 are again fed the signals $V_r$, $V_b$ and $V_g$.

Figure 4:
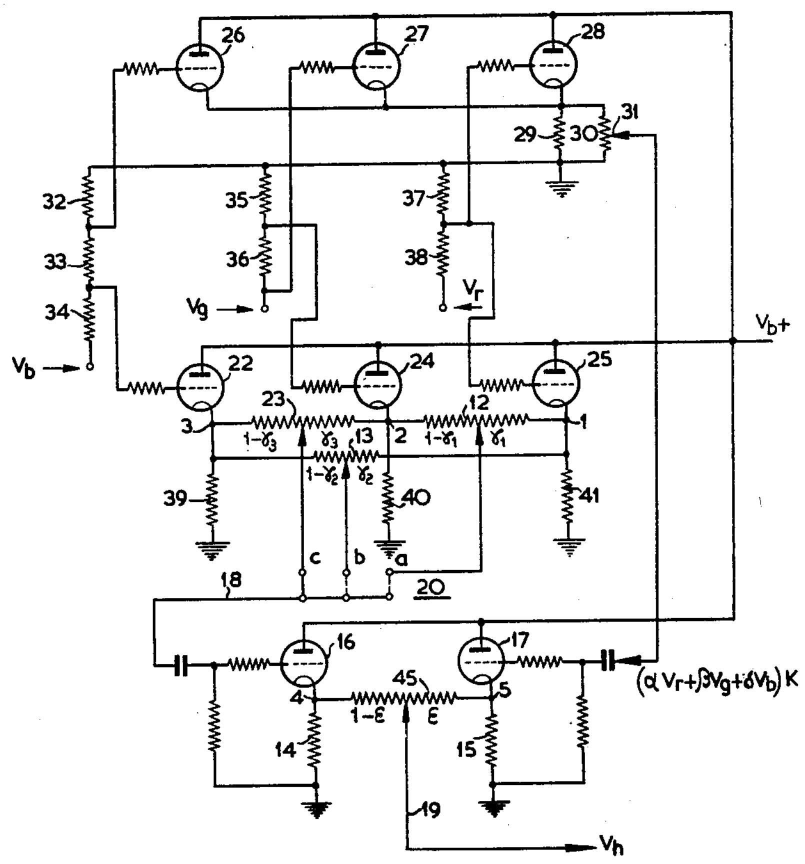
FIG. 4 shows the total circuit arrangement in the practical embodiment.

A practical embodiment of the complete arrangement is shown in FIG. 4, in which corresponding parts are designated correspondingly as far as possible. According to this figure the yes or no normal gamma corrected signals $V_r$, $V_g$ and $V_b$ are fed via the networks of the resistors 32, 33, 34 for the signal $V_b$, 35 and 36 for the signal $V_g$ and 37, 38 for the signal $V_r$, to the control-grids of the tubes 26, 27 and 28. These tubes produce, across the cathode resistor 29, a signal which is obtained, by means of the tapping 31 adjusting the signal to the desired value, from the resistor 30, which is connected in parallel with the resistor 29. The signal at tapping 31 had the form:

$$V_{1j}=K(\alpha.V_r+\beta.V_g+\delta V_b)$$

wherein K designates a proportionality factor which varies with the employed resistors and with the position of the tapping 31. To the tubes 22, 24 and 25, which replace in this arrangement the voltage sources 10, 11 and 9, respectively, are fed the signals $K_1V_b$, $K_1V_g$ and $K_1V_r$ (wherein $K_1$ designates a proportionality factor) so that across the resistors 39, 40 and 41 are produced signals, which can be obtained in the manner described above from the resistors 12, 13 and 23. The further part of the arrangement is, with the exception of the networks for the tubes 16 and 17, identical to that shown in FIGS. 1 and 3 and is self explanatory. Also in this case a satisfactory operation requires that the amplitudes of the signals at points 1, 2 and 3 should have the same value and also those at points 4 and 5.

With a practical embodiment as shown in FIG. 4 the proportionality factors are:

$$\alpha=0.3;\ \beta=0.6 \text{ and } \delta=0.1$$

The resistors are in this case:

$$R_{32}=410\Omega;\ R_{35}=R_{36}=R_{37}=R_{38}=1000\Omega$$

$$R_{33}=680\Omega;\ R_{34}=1100\Omega$$

With these resistance values the signals fed to the tubes 26, 27 and 28 are: $^{11}/_{59}$ $V_b$, $V_g$ and ½ $V_r$ respectively, whilst the signals fed to the tubes 22, 24 and 25 are: ½ $V_b$, ½$V_g$ and ½ $V_r$, so that $K_1=0.5$. The tubes 22, 24 and 25 are connected as cathode-followers, so that the voltages at points 3, 2 and 1 are attenuated by a factor of approximately 0.6. The voltages at these points then become: 0.3 $V_b$, 0.3 $V_g$ and 0.3 $V_r$. By adjusting the tapping 31 in a manner such that the total signal across the resistors 29 and 30 is multiplied by about 0.18, the total output signal becomes:

$$0.18(0.5V_r+V_g+{}^{11}/_{59}V_b)\approx 0.3(0.3V_r+0.6V_g+0.1V_b)$$

The proportionality factor K thus amounts in this arrangement to about 0.3.

It will be obvious that the use of this variable matrix circuit is not restricted to the use as a forming circuit for the formation of the correction signal $V_h$. With the aid of this arrangement a new combination signal may be produced, the coefficients of which can be varied in accordance with the requirements. If, for example, formula (7) is rewritten, we obtain:

$$V_h\approx\{\epsilon.(1-\gamma_2)+\alpha-\epsilon.\alpha\}V_r+\{\epsilon.\gamma_2+\delta-\epsilon.\delta\}V_b \\ +(\beta-\epsilon.\beta)V_g=\phi_1.V_r+\phi_2:V_b+\phi_3.V_g$$

wherein $\phi_1$, $\phi_2$, and $\phi_3$ may be varied, at will, between the values 0 and 1. Thus colour dilation in the reproduced picture can be corrected when reproducing tubes having different kinds of phosphors are used. In this case $\phi_1$, $+\phi_2$ $+\phi_3$ must always be equal to 1, which is fulfilled with each adjustment, if it obtains that $\alpha+\beta+\delta=1$.

Figures 5A, 5B:
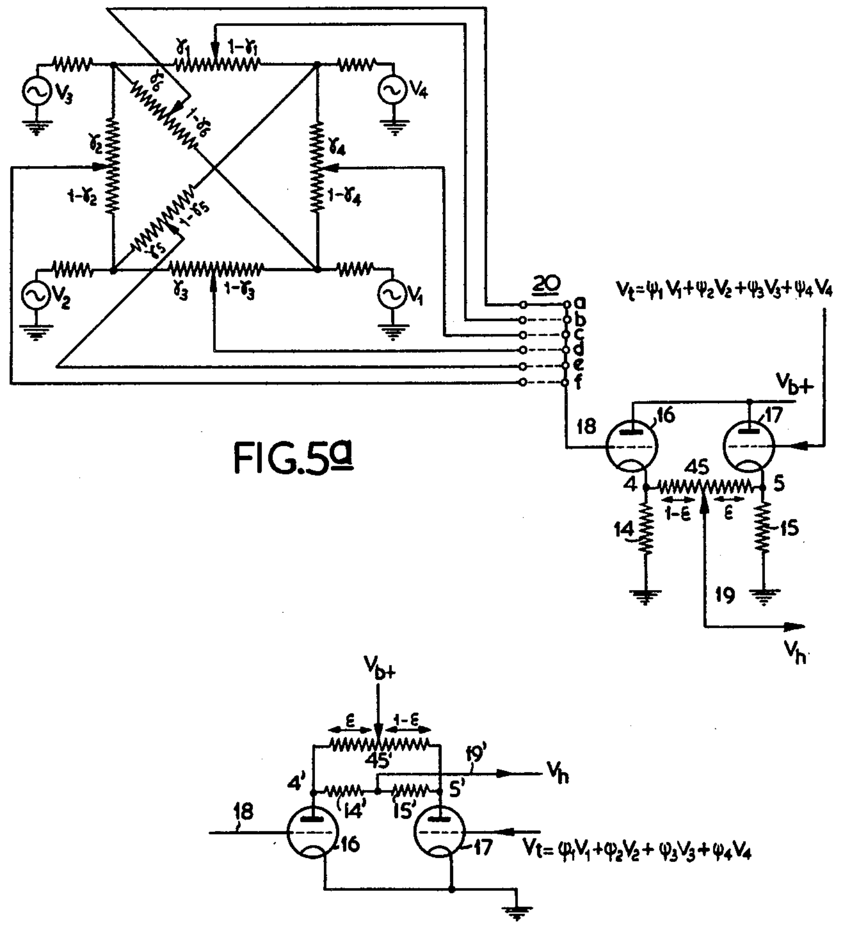
FIG. 5 shows an arrangement extended in accordance with the principle illustrated in FIG. 1.

A further extension of the arrangement is possible by increasing the number of signals, the number of potentiometers and the number of contacts of the switch 20. FIG. 5*a* shows an arrangement according to the invention, in which four signals $V_1$, $V_2$, $V_3$ and $V_4$ are fed to four angular points of a network. This network is built up of six tapped potentiometers, which tappings are connected to the six contacts *a* to *f* of the switch 20. To the tube 17 is fed the complex signal $$V_t=\psi_1.V_1+\psi_2.V_2+\psi_3.V_3+\psi_4.V_4$$

If the switch 20 occupies the position shown, the signal $V_h$ is found to be:

$$V_h=\epsilon\{(1-\gamma_6).V_3+\gamma_6.V_1\}+(1-\epsilon).\{\psi_1.V_1+\psi_2.V_2 \\ +\psi_3.V_3+\psi_4.V_4\}=\{\epsilon.\gamma_6+1-\epsilon).\psi_1\}.V_1 \\ +(1-\epsilon).\psi_2.V_2+\{\epsilon.(1-\gamma_6)+(1-\epsilon).\psi\}_3V_3 \\ +(1-\epsilon).\psi_4.V_4=\eta_1.V_1+\eta_2.V_2+\eta_3.V_3+\eta_4.V_4$$

wherein it obtains that:

$$\eta_1+\eta_2+\eta_3+\eta_4=1$$

if $$\psi_1+\psi_2+\psi_3+\psi_4=1$$

from which follows that: for $V_1=V_2=V_3=V_4=V$: $V_h=V$, irrespective of the positions of the tappings concerned. The same applies to the signals obtained, if the switch 20 connects a different contact to the conductor 18.

For $\epsilon=1$, we can obtain a signal consisting of the combination of two of the four composing signals. For the case shown in FIG. 5*a*, this becomes:

$$V_h=\gamma_6.V_1+(1-\gamma_6).V_3$$

For $\epsilon=0$, we can obtain the initial signal $V_t$.

The arrangement from which the signal is finally obtained may also be constructed as is shown in FIG. 5*b*. The resistor network is not provided on the cathode side of the tubes 16 and 17, but on the anode side thereof. The tapping of the resistor 45' is connected to the positive terminal of the direct-voltage source (not shown) and the conductor 19', from which the signal $V_h$ is obtained, is connected to the junction of the identical resistors 14' and 15'. By displacing the tapping interpolation may be carried out between the signals fed to the tubes 16 and 17.

By extending the number of supplied signals to *m*, *m* angular points are required, which are interconnected via $m\ (m-1)/2$ resistors, each provided with a tapping. The tappings are connected to the same number of contacts of a switch 20, of which the main contact is connected to the conductor 18.

The signal fed to the control-grid of tube 17 now has the form:

$$V_t=(\psi_1\cdot V_1+\psi_2\cdot V_2+\ .\ .\ .\ \psi_m\cdot V_m$$

with:

$$\psi_1+\psi_2+\psi_3\ .\ .\ .\ \psi_m=1$$

The output signal becomes:

$$V_4=\epsilon\{(1-\gamma_x)\cdot V_k+\gamma_x\cdot V_l\}+ \\ (1-\epsilon)\cdot\{\psi_1\cdot V_1+\psi_2\cdot V_2+\ .\ .\ .\ \psi_m\cdot V_m\}$$

wherein $V_k$ and $V_l$ designate two arbitrary signals of the series of signals $V_1\ .\ .\ .\ V_m$. After conversion $V_h$ is found to be:

$$V_h=\{\eta_1\cdot V_1+\eta_2\cdot V_2\ .\ .\ .\ \eta_m\cdot V_m\}$$

to which again applies:

$$\eta_1+\eta_2+\ .\ .\ .\ \eta_m=1$$

Further combinations are possible by connecting the tappings of the potentiometers not to the contacts of the switch 20 but to the control-electrodes of discharge tubes. With $m=3$, three discharge tubes are used, which constitute together an adding circuit. In the case of FIG. 1 the output signal of this adding circuit is:

$$V'_h=\{V_r(1-\gamma_2)+V_b\cdot\gamma_2\}+\{V_r\cdot(1-\gamma_1)+V_g\cdot\gamma_1\} \\ +\{V_g\cdot(1-\gamma_3)+V_b\cdot\gamma_3\}=V_r\cdot\{(1-\gamma')+(1-\gamma_1)\} \\ +V_g\cdot\{\gamma_1+(1-\gamma_3)\}+V_b\cdot\{\gamma_2+\gamma_3\}$$

The sum of these coefficients is:

$$1-\gamma_2+(1-\gamma_1)+\gamma_1+(1-\gamma_3)+\gamma_2+\gamma_3=3$$

If the output signal $V'_h$ is multiplied by one third, for example with the aid of a potentiometer circuit, the sum of the coefficients is also equal to 1, irrespective of the positions of the tappings on the potentiometers 12, 13 and 23.

Instead of using discharge tubes, use may be made of other amplifying elements in the arrangements described above, for example transistors.

What is claimed is:

1. A circuit for forming an output signal from a plurality of input signals in which the output signal is linearly dependent upon said input signals, said circuit comprising tapped impedance means, means applying said signals to the terminals of said impedance means, means providing a sum signal, said sum signal being the sum of said input signals in predetermined proportions, first and second amplifying devices each having an input electrode and an output electrode, means connecting the tap of said impedance means to one input electrode, means applying said sum signal to the other input electrode, a tapped impedance connected between said output electrodes, and output circuit means connected to the tap of said tapped impedance.

2. A circuit for varying the coefficients determining linear relationship between a plurality of first input signals and an additional input signal linearily dependent upon said first input signals, said circuit comprising first tapped impedance means, means applying said first input signals to different end terminals of said impedance means, matrix means for deriving said additional input signal from said first input signals, first and second amplifying devices each having an input electrode and an output electrode, means connecting the tap of said first impedance means to one of said input electrodes, means applying said additional input signal to the other said input electrode, second tapped impedance means connected between said output electrodes, and output circuit means connected to the tap of said second tapped impedance means.

3. The circuit of claim 2, in which said first impedance means comprises a network having $m$ terminals, said terminals being interconnected by $$\frac{m(m-1)}{2}$$

impedances having variable taps, $m$ being the number of said first input signals, said first input signals being applied to separate said terminals, switch means for selectively connecting said variable taps to said one input electrode, said additional input signal $V_t$ has the form:

$$V_t=\psi_1 V_1+\psi_2 V_2+ \dots \psi_m V_m$$

in which $V_1, V_2 \dots V_m$ are the input signals and $\psi_1, \psi_2 \dots \psi_m$ are the respective fixed coefficients, the sum $\psi_1+\psi_2+ \dots \psi_m$ being equal to 1, the signal $V_h$ at the tap of said second impedance having the form:

$$V_h=\eta_1 V_1+\eta_2 V_2+ \dots \eta_m V_m$$

wherein $\eta_1, \eta_2 \dots \eta_m$ are variable coefficients having a constant total sum of 1.

4. A circuit for correcting the brightness of an individual color of a brightness color television signal $V_t$ having the form:

$$V_t=\psi_1 V_1+\psi_2 V_2+\psi_3 V_3$$

wherein $V_1$, $V_2$ and $V_3$ are the individual color signals, $\psi_1$, $\psi_2$ and $\psi_3$ are the respective fixed linear coefficients, and $\psi_1+\psi_2+\psi_3=1$, said circuit comprising separate sources for said individual color signals, three resistors connected serially in a closed loop, said resistors having variable taps, means applying said individual color signals of the same level to separate junctions of said three resistors, means deriving said brightness signal from said individual color signals, first and second amplifying devices each having a control electrode and an output electrode, means selectively connecting said variable taps to one control electrode, means applying said brightness signal to the other control electrode, resistance means connected between said output electrodes, and output circuit means connected to a variable tap on said resistance means.

References Cited in the file of this patent

UNITED STATES PATENTS

| | | |
|---|---|---|
| 2,657,254 | Wintringham | Oct. 27, 1953 |
| 2,807,660 | Rose | Sept. 24, 1957 |
| 2,846,574 | Schroeder | Aug. 5, 1958 |
| 2,848,528 | Wall | Aug. 19, 1958 |
| 2,858,362 | Bedford | Oct. 28, 1958 |
| 2,903,506 | Livingston | Sept. 8, 1959 |
| 2,961,483 | Dixon | Nov. 22, 1960 |
| 2,981,792 | Farber | Apr. 25, 1961 |

OTHER REFERENCES

Hazeltine Laboratories Staff, "Principles of Color Television," Wiley & Sons, Inc., July 1956, pages 412–413.

Hazeltine Laboratories Staff, "Principles of Color Television," Wiley and Sons, Inc., July 1956, page 240.